US010289860B2

(12) United States Patent
Woo

(10) Patent No.: US 10,289,860 B2
(45) Date of Patent: May 14, 2019

(54) METHOD AND APPARATUS FOR ACCESS CONTROL OF APPLICATION PROGRAM FOR SECURE STORAGE AREA

(71) Applicant: NAMUSOFT CO., LTD, Seoul (KR)

(72) Inventor: Jong Hyun Woo, Seoul (KR)

(73) Assignee: NAMUSOFT CO., LTD., Seoul (KR)

( * ) Notice: Subject to any disclaimer, the term of this patent is extended or adjusted under 35 U.S.C. 154(b) by 212 days.

(21) Appl. No.: 15/304,191

(22) PCT Filed: Apr. 1, 2015

(86) PCT No.: PCT/KR2015/003258
§ 371 (c)(1),
(2) Date: Oct. 14, 2016

(87) PCT Pub. No.: WO2015/160118
PCT Pub. Date: Oct. 22, 2015

(65) Prior Publication Data
US 2017/0039383 A1    Feb. 9, 2017

(30) Foreign Application Priority Data

Apr. 15, 2014  (KR) .................. 10-2014-0045070

(51) Int. Cl.
*G06F 21/00* (2013.01)
*G06F 21/62* (2013.01)
(Continued)

(52) U.S. Cl.
CPC ........ *G06F 21/6218* (2013.01); *G06F 21/121* (2013.01); *G06F 21/60* (2013.01); *G06Q 10/10* (2013.01)

(58) Field of Classification Search
CPC .... G06F 21/6218; G06F 21/121; G06F 21/60; G06Q 10/10
See application file for complete search history.

(56) References Cited

U.S. PATENT DOCUMENTS

| 8,839,450 B2 | 9/2014 | Durham et al. |
| 2009/0038017 A1* | 2/2009 | Durham .............. G06F 12/1408 726/27 |

(Continued)

FOREIGN PATENT DOCUMENTS

| JP | 2009-020624 A | 1/2009 |
| KR | 10-1098947 B1 | 12/2011 |

(Continued)

*Primary Examiner* — Kendall Dolly
(74) *Attorney, Agent, or Firm* — Rabin & Berdo, P.C.

(57) ABSTRACT

The present invention relates to a method for, when using security software which allows documents to be utilized in PCs and terminals in companies or institutions but not to be leaked therefrom, enabling members to view, generate, edit and delete work files that are generated in the course of business in only secure areas and to freely view, generate and edit non-business personal documents with the same PCs and the same editing software in non-secure areas. More specifically, the present invention relates to a method for, when a program enabling access to a certain secure storage space is set to be a security program, allowing the program to be driven only in the secure storage space by pre-copying a temporary work file (cache file), a folder path, a license file, etc. required to drive the program, to a secure storage space; switching so as to recognize the space as a secure area to which the original path that the program uses has been copied; and allowing the program to view, correct, delete and edit documents in only secure storage spaces.

6 Claims, 8 Drawing Sheets

(51) Int. Cl.
*G06F 21/60* (2013.01)
*G06Q 10/10* (2012.01)
*G06F 21/12* (2013.01)

(56) References Cited

U.S. PATENT DOCUMENTS

2013/0332430 A1* 12/2013 Margalit ............. G06F 11/3476
707/695
2015/0074419 A1  3/2015 Durham et al.

FOREIGN PATENT DOCUMENTS

| KR | 10-1299051 B1 | 9/2013 |
| KR | 10-1373542 B1 | 3/2014 |

\* cited by examiner

FIG. 9

METHOD AND APPARATUS FOR ACCESS CONTROL OF APPLICATION PROGRAM FOR SECURE STORAGE AREA

TECHNICAL FIELD

The present invention relates to a technology that can divide and manage documents into a business document which should be secured and managed under a general PC business environment in which data generated in terminals such as a personal PC, and the like is divided into business data and personal data and other general documents (alternatively, personal documents).

BACKGROUND ART

In companies or institutions, storage space encryption and program access control technologies that allow files to be kept only in a designated storage space are used together with leakage prevention of various office files, CAD drawing files, program source files, and the like generated in terminals such as PCs, and the like.

However, with specialization and enlargement of a program itself as well as version-up of the program, various lower processes may be accompanied according to a complicated work request of a user or a temporary file may be prepared in order to process a complicated operation process. In general, the specialized program may verify whether a configuration file or a license file required before driving is present or prepare the temporary file in various paths for stable execution and management of intermediate operation objects in the course of driving. Further, the license file may be reupdated in the course of driving or in completion in order to verify normal completion of the program.

However, related art is developed by a scheme in which a fractional program (alternatively, process) controls a file to be read or written in a specific folder (alternatively, drive) not to prevent information leakage through a temporary work file which is positioned on a temporary work path used by the program.

Further, when a security technology that encrypts and decrypts all file inputs/outputs which a specific program (alternatively, process) generates and reads is applied, the corresponding program cannot be personally used under a situation in which security is not required. The reason is that since the temporary work file and the license file are all encrypted as well as the data file used by the corresponding program, the corresponding program can be driven only in a security state.

Only when the environment in which the security is not required and an environment in which the security is required can be used to be switched to each other, hostility of members using a security technology can be reduced, but the switching is not smooth in the related art, and as a result, there are a lot of oppositions in the course of introduction of the related art. Further, as a business environment is changed due to bring your own device (BYOD) together with a Cloud service, a new security technology that can strengthen the security while utilizing personal terminals such as a notebook, and the like for the business is required.

DISCLOSURE

Technical Problem

An embodiment of the present invention is directed to a method and an apparatus for, when using security software which allows documents to be utilized in PCs and terminals in companies or institutions but not to be leaked therefrom, enabling members to view, generate, edit and delete work files that are generated in the course of business in only secure areas and to freely view, generate and edit non-business personal documents with the same PCs and the same editing software in non-secure areas.

Further, another embodiment of the present invention is directed to a method and an apparatus for, when a program enabling access to a certain secure storage space is set to be a security program, allowing the program to be driven only in the secure storage space by pre-copying a temporary work file (cache file), a folder path, a license file, etc. required to drive the program, to a secure storage space; switching so as to recognize the space as a secure area to which the original path that the program uses has been copied; and allowing the program to view, correct, delete and edit documents in only secure storage spaces.

Technical Solution

According to an aspect of the present invention, provided is a computer implemented method for executing access control of an application program for a secure storage area, including: executing, by a user terminal, a security agent for business security according to user authentication; copying a file required for driving for each application program which is permitted to access the secure storage area for the business security or a folder of an original path to a predetermined path in the secure storage area; and switching a drive path of the corresponding application program from the original path to a path depending on the copied folder in the secure storage area for each application program which is permitted to access the secure storage area.

In an embodiment, the method may further include, when the security agent is executed, extracting a security policy regarding an access permission program which is permitted to access the security storage area or process information, file or folder information which needs to be copied before driving the access permission program, and drive path switching information of the access permission program, to correspond to the authenticated user.

In an embodiment, the method may further include, wherein the security policy includes file or folder information which needs to be recovered to an original drive path from the folder of the switched drive path when execution of the security agent is completed, extracting the file or folder which needs to be recovered for each application program which is permitted to access the secure storage area from the security policy and recopying or updating the extracted file or folder to the original path when the execution of the security agent is completed.

In an embodiment, the method may further include: determining, when an application or process which attempts the access to the secure storage area is present, whether the program or process attempting the access corresponds to the access permission program or process depending on the security policy; and permitting the access by the access attempt program or process to the secure storage area and recognizing the program or process which is permitted to access the secure storage area as a monitoring process when the program or process corresponds to the access permission program or process according to a result of the determination.

In an embodiment, the method may further include permitting, when a text copy event of the file in the secure storage area by the monitoring process or a text attach event to other process is attempted, execution depending on the corresponding event only when the other process is the monitoring process.

In an embodiment, the method may further include interrupting execution of storing of the corresponding file when the monitoring process attempts storing the file in a storage area other than the secure storage area.

In an embodiment, the method may further include initializing at least one of a file system, a cache clipboard, and a registry value supported by an operating system when the execution of the security event is completed.

In an embodiment, the method may further include: verifying version information on a non-verified application program, file or folder information required to drive the corresponding program file or folder information which needs to be recovered or updated, and information on an original installation path of the corresponding program; and adding the non-verified application program to a security target program by reflecting the verification result to the security policy.

Advantageous Effects

According to embodiments of the present invention, documents generated in terms of business and personally generated documents can be separated and business files generated while members perform the business are read, generated, edited, and deleted, the personal documents can be arbitrarily read, generated, and edited in non-secure areas by using the same application program in the same terminal in addition to the business.

Further, according to the embodiments of the present invention, secondary information leakage can be prevented through a temporary work file required during an intermediate operation process of a program unlike the existing security software and a designated application program should not be used only under a security environment but the application program can be used for a personal purpose without security according to a storage position of a file.

BRIEF DESCRIPTION OF THE DRAWINGS

FIG. 9 illustrates an event log embodiment which disables data copy between programs or a mouse drag and drop event when one process is a security process and the other one process operates as a non-security process while the same program is driven by two processors.

BEST MODE FOR THE INVENTION

Figure 1:
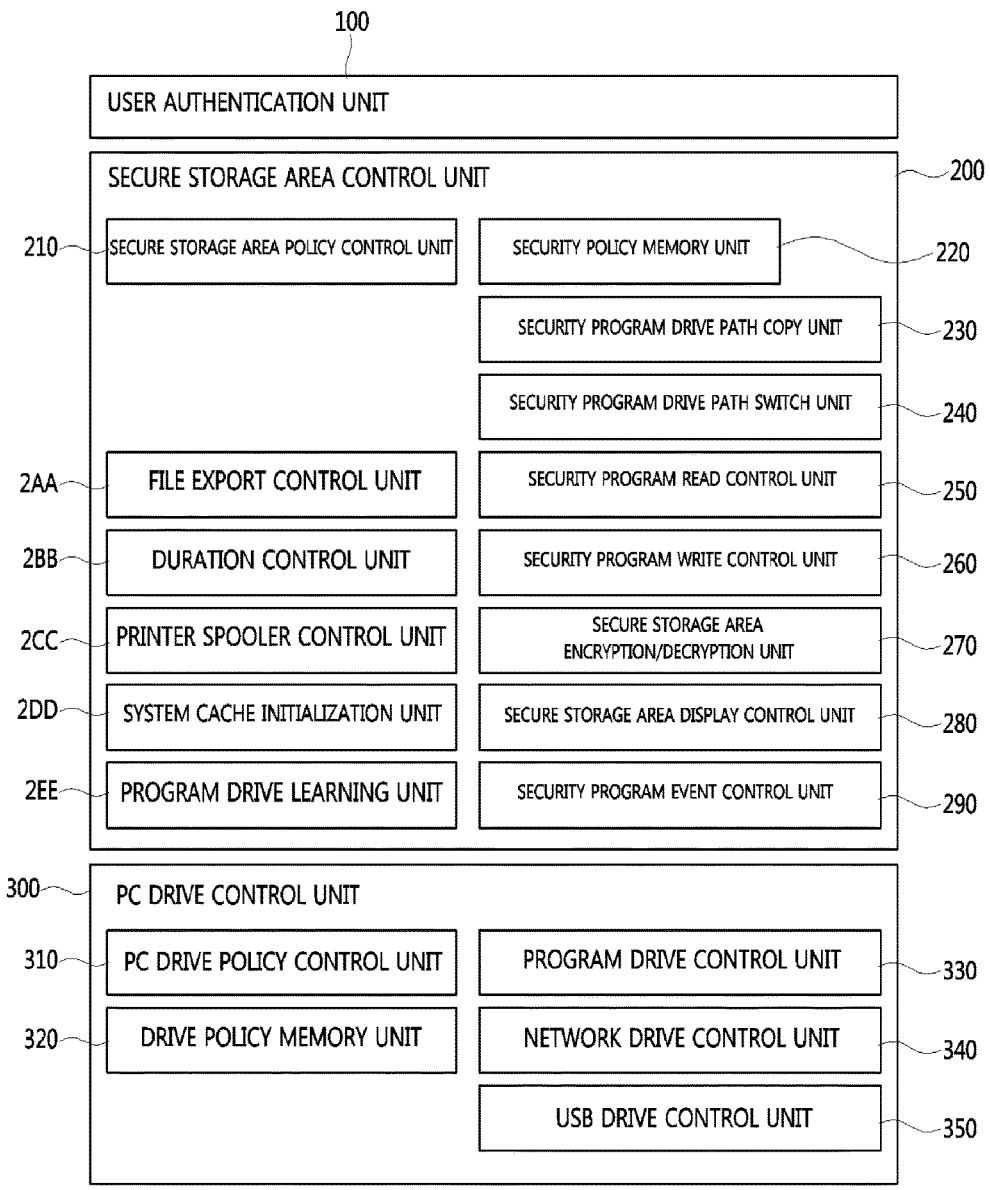
FIG. 1 is a diagram illustrating respective components constituting an access control apparatus of an application program according to an embodiment of the present invention.

The present invention will be described more fully hereinafter with reference to the accompanying drawings, in which embodiments of the invention are shown. However, the present invention may be implemented by various different forms and is not limited to the embodiments described herein, and it should be understood that the present invention covers all the modifications, equivalents and replacements included within the idea and technical scope of the present invention.

In describing the present invention, in the following description, a detailed explanation of known related technologies may be omitted to avoid unnecessarily obscuring the subject matter of the present invention.

Accordingly, the drawings and description are to be regarded as illustrative in nature and not restrictive and like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. Further, terms including "unit", "module", and the like disclosed in the specification mean a unit that processes at least one function or operation and this may be implemented by one or more hardware or software or a combination of hardware and software.

Figure 2:
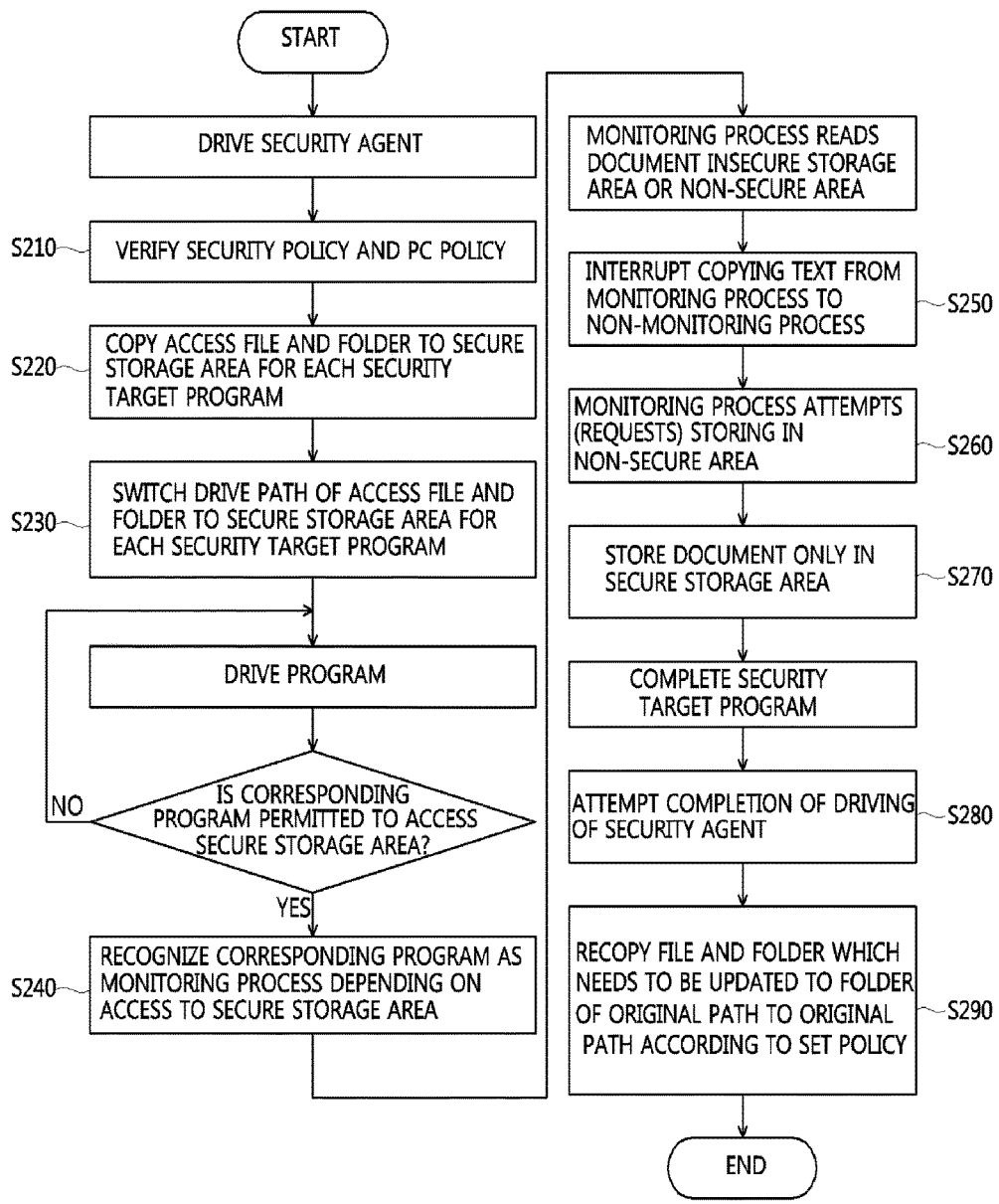
FIG. 2 is a flowchart of an access control method of an application program according to an embodiment of the present invention.

FIG. 1 is a diagram illustrating respective components constituting an access control apparatus of an application program according to an embodiment of the present invention. In addition, FIG. 2 is a flowchart of an access control method (named as a secure agent in FIG. 2) of an application program according to an embodiment of the present invention. Hereinafter, the embodiment of the present invention will be described together with reference to the flowchart of FIG. 2 and FIGS. 3 to 9 based on FIG. 1.

Referring to FIG. 1, the access control apparatus of an application program according to the embodiment of the present invention includes a user authentication unit 100, a secure storage area control unit 200, and a PC drive control unit 300. The user authentication unit 100 is a general component unit that authenticates a user ID and a password. Herein, the user authentication unit 100 is connected with another computer system or external server through a network (not illustrated) to perform user authentication.

The secure storage area control unit 200 may include a secure storage area policy control unit 210, a security policy memory unit 220, a security program drive path copy unit 230, a security program drive path switch unit 240, a security program read control unit 250, a security program write control unit 260, a secure storage area encryption/decryption unit 270, a secure storage area display control unit 280, and a security program event control unit 290. Further, according to an implementation scheme, the secure storage area control unit 200 may further include a file export control unit 2AA, a duration control unit 2BB, a printer spool control unit 2CC, a system cache initialization unit 2DD, and a program drive learning unit 2EE.

The secure storage area policy control unit 210 givens an indication to the security program drive path copy unit 230 to copy a file configured for each corresponding program by referring to a user security policy stored in the security policy memory unit 220 [see S210 and S220 of FIG. 2]. As a result, when copying is completed, the secure storage area policy control unit 210 gives a command to switch the security program drive path switch unit 240 to recognize a drive path of the corresponding program as a secure storage area [see S230 of FIG. 2]. Further, the secure storage area policy control unit 210 is a component unit that permits reading of a corresponding document when an access attempt program regarding the secure storage area sensed through the security program read control unit 250 corresponds to a security program according to a security policy or controls the corresponding document to be stored only in the secure storage area when making an attempt of storage through the security program write control unit 260. Herein, the security program is designated as a program which is predesignated to access the secure storage area according to the security policy among the application programs.

The security policy memory unit 220 is a component unit that memories a program name which is permitted to be used in the secure storage area for each corresponding user, an eigen value for each program, a file or folder path value which needs to be copied in advance while driving for each corresponding program, a file or folder path value which needs to be copied when the secure storage area control unit 200 is completed, an encryption/decryption key value of the secure storage area, values of folders or drives constituting the secure storage area, and the like. A method for memorizing the security policy for each user may be kept in an encrypted file format or performed by receiving a value from a server.

That is, the security policy memory unit 220 stores information regarding paths of files or folders which need to be copied in the secure storage area in advance while the program is driven when program access control for the secure storage area is configured according to a program characteristic. Further, the security policy memory unit 220 may store a license file, a work file, a folder path value, and the like of a program which needs to be particularly reupdated so as for a program to be normally driven in a general area (that is, a non-secure area) in a license or a temporary work file used when the secure storage area control unit 200 is completed.

According to the aforementioned description, a security policy which needs to be configured (memorized) is described below for each program as an example.

As an example, since a program such as a notepad (nopade.exe) does not read configuration data required for driving or use a cache folder for start, only a process name may be configured to access the secure storage area.

Figure 3:
FIG. 3 illustrates an error screen example which occurs when a drive path of an application program is not appropriate.
Figure 4:
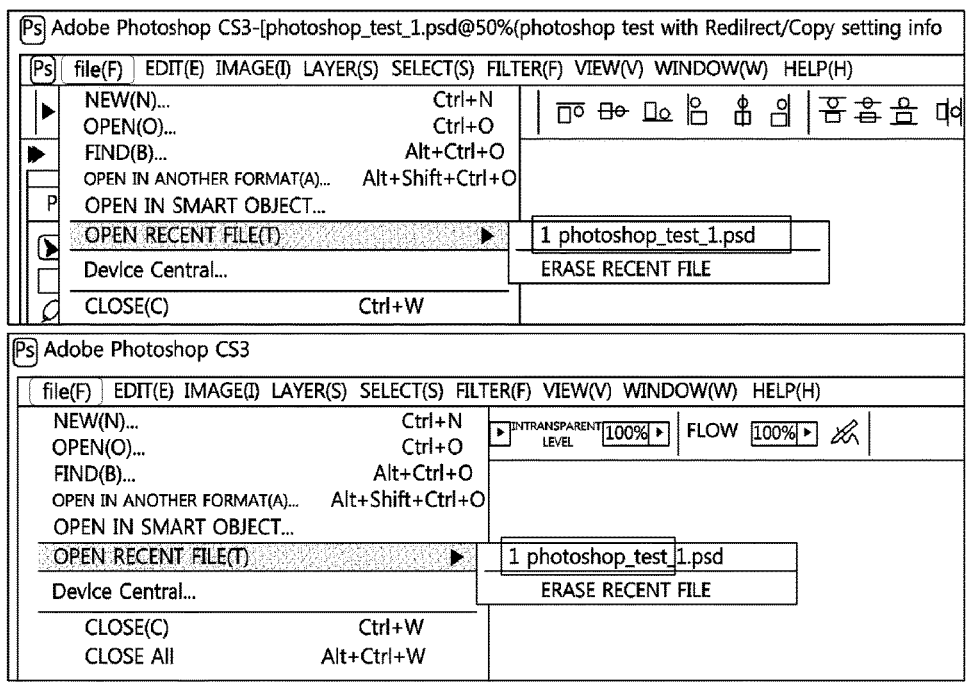
FIG. 4 illustrates an embodiment illustrating a difference between a recent file list in a secure area and a recent file list in a non-secure area of a Photoshop program.

On the contrary, driving an MS Word program needs to start while reading or writing a temporary file or folder path designated while installation in order to drive the program. When a specific temporary data file which needs to be read while driving may not be found, an error occurs while driving as illustrated in FIG. 3. Therefore, the temporary file and folder path which needs to be read while driving needs to be copied to the secure storage area for normal driving in the secure storage area and a program drive path needs to be changed to the copied secure storage area.

Further, when the program operates differently according to temporary work information like a Photoshop program, work information which is worked in the secure storage area and work information which is worked in the non-secure area may be configured to be separated from each other by configuring only the drive path to be changed. Referring to a Photoshop embodiment, it can be seen that a list of recently read documents when the work information is worked in the secure storage area and the list of recently read documents when the work information is worked in the non-secure area are differently displayed.

Figure 5:
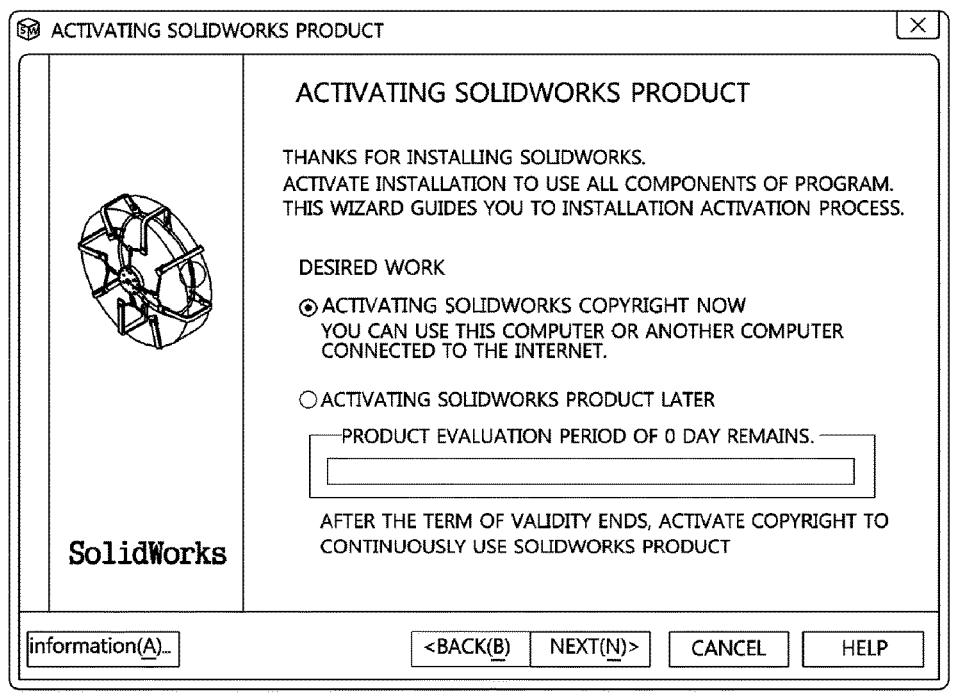
FIG. 5 illustrates an embodiment in which a CAD program which operates in the secure area misoperates as a license file is cracked after access control for a secure storage area is completed.
Figure 6:
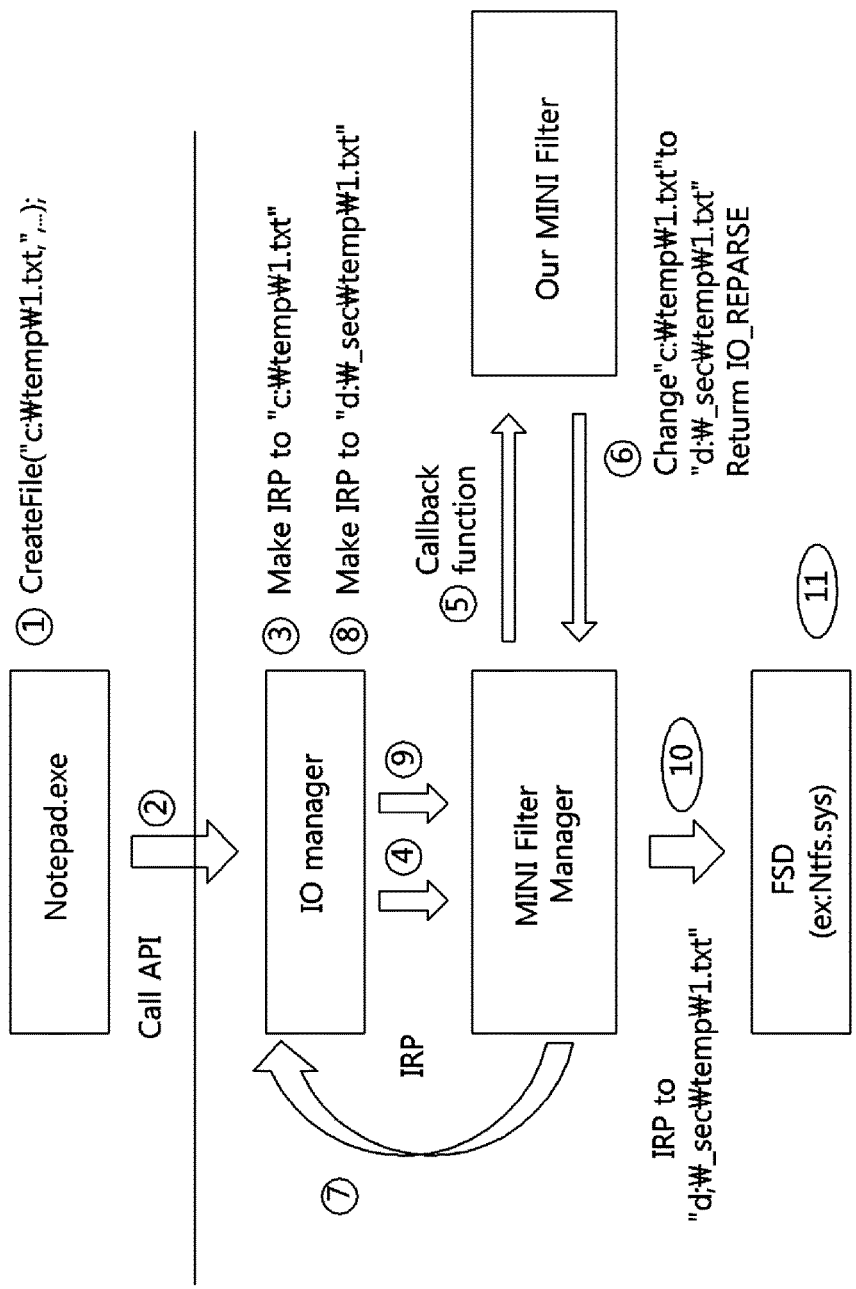
FIG. 6 is a configuration diagram of one example in which a Notepad program switches a drive environment that allows a file in a secure area to be opened by using a mini filter drive in spite of opening a file in a non-secure area.
Figure 7:
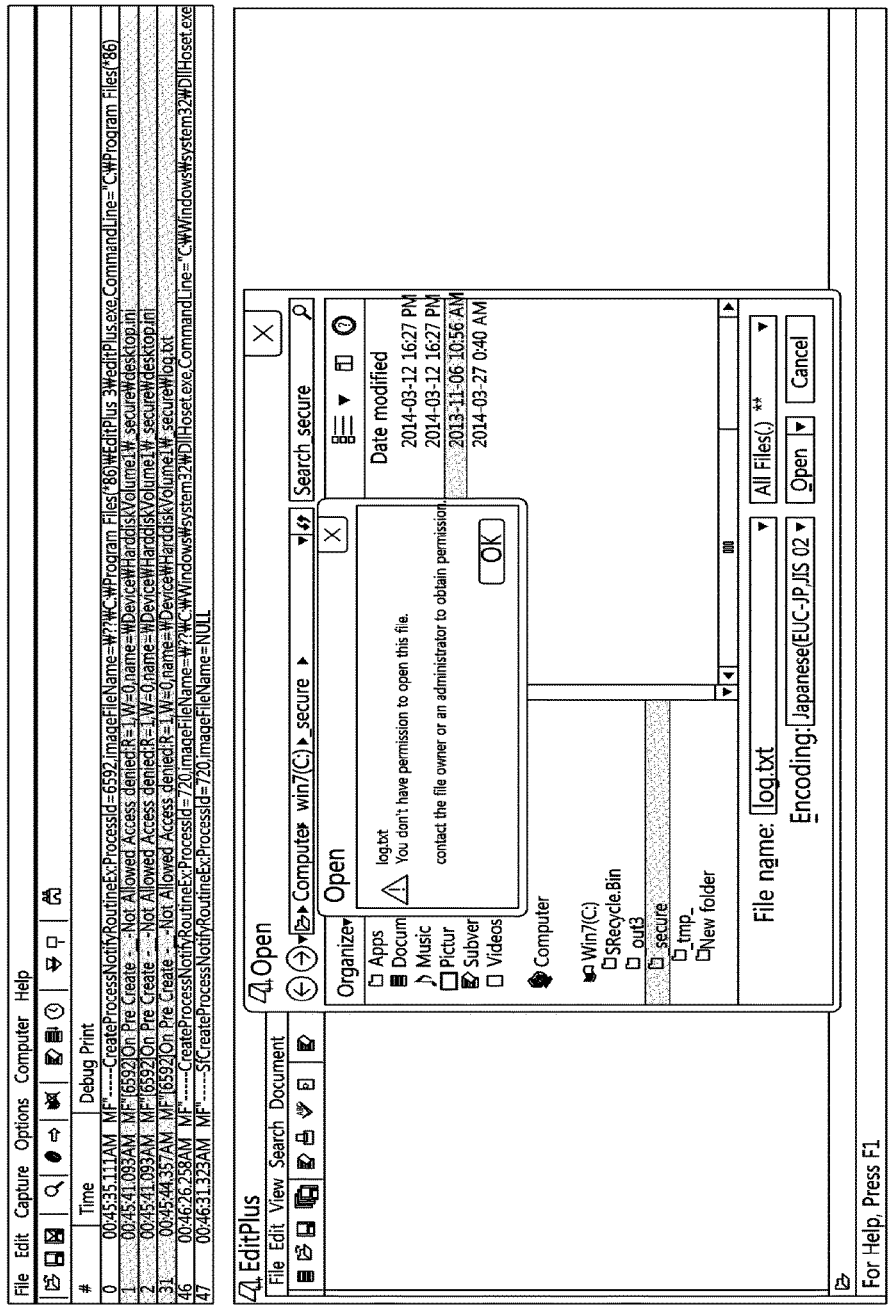
FIG. 7 illustrates an embodiment in which an Editorplus program is interrupted while making a file access attempt to the secure area.

Further, in the case where the license file is updated at start and completion points of time while the license file is installed in the temporary file and folder which are installed on a path while installation like an Auto Cad or Solid Works program, when the secure storage area control unit 200 is completed, the license file which the corresponding CAD program last refers to in the secure storage area needs to be recopied to an original path. In the case where the license file which the corresponding CAD program last refers to is not recopied to the original path as described above, when the CAD program is thereafter driven in the no-secure area, the license file of the program is cracked or installed again as illustrated in FIG. 5 or the license key is newly issued, and as a result, using the CAD program for a personal purpose in addition to a business purpose may be interrupted.

Further, the security policy memory unit 220 may possess the eigen value together in order to determine whether the corresponding program is actually the same program in addition to the program name to access the secure storage area. Herein, the corresponding eigen value may be constituted by even a hash value of a driving binary file in addition to additional information including a make, a version, a product name, and the like which are corresponding program attribute information.

Besides, the security policy memory unit 220 may memory an output policy regarding whether the program accessing the secure storage area may perform a document output by using a printer spool together with a program permission list for each user.

The security program drive path copy unit 230 is a component unit that copies the license file, the temporary work file, and the temporary work folder which the program configured to access the secure storage area needs to read or use while driving to a designated space in the secure storage area.

As an example, a folder structure in a security folder in which copying is performed may be configured by copying an absolute path used as a path of the actual corresponding program in the secure storage area to a lower folder. For example, in the case where an actual temporary work folder is C:\DocumentandSetting\ApllicationCash, the actual temporary work folder is copied to the security folder, an example is copied to S:\_Secure\C\DocumentandSetting\ApplicationCash and only the path may be copied according to the policy and all data including lower data in the corresponding folder may be copied.

Further, the security program drive path copy unit 230 may be configured to generate copied data as a hidden file and a hidden folder at the time of copying the corresponding file and folder so as not to be exposed the user in the secure storage area.

In addition, the security program drive path copy unit 230 may recopy the license file or a required file to an original storage area from the secure storage area according to a program configuration policy for each user when the secure storage area control unit 200 is completed.

The security program drive path switch unit 240 is a component unit that is configured to recognize the folders the license file, the temporary work file, and the temporary work which the corresponding program needs to refer to as not an actual path but a secure work area copied in the secure storage area when the program is driven so as to read and generate the data in the secure storage area.

As an example, Redirection which an operating system guarantees is configured at a level of Win32 to switch the corresponding file and folder to the secure storage area and a mini filter drive is implemented in a file system at a level of a filter drive or the mini filter drive to switch a request for the corresponding file system to a work space in the secure storage area.

In the embodiment, a detailed example of redirecting storage is described by using a mini filter drive technology. As an example, an example in which the Nodepad program stores a file in a secure storage area (D:\\_secure\temp\1.txt) in spite of storing a file in a non-secure area (C:\temp\1.txt) is described according to FIG. 6.

In a first event, Notepad.exe calls CreateFile in order to generate the c:\temp\1.txt file. In a second event, in the case of file deletion, name change, and the like, corresponding APIs are called and in a third event, a request is transferred to a kernel level from Kernel32.dll through ntdll.dll. Fourth, an IC manager creates IRP toward c:\temp\1.txt and transfers the created IRP to a driver stack. Fifth, the IRP is transferred to a Mini filter manager. In this case, the IRP is a request for c:\temp\1.txt. Sixth, the Mini filter manager sends packet data to a pre callback function of the mini filter driver and in a callback function of the mini filter driver, a request toward "c:\temp\1.txt" is changed to "d:\\_sec\temp\1.txt" to return IO_REPARSE. Seventh, the mini filter manager verifies IO_REPARSE and requests creating the IRP again to the IO manager. Eighth, the IC manager creates IRP toward "d:\\_sec\temp\1.txt" again. Ninth, a newly created packet is downloaded to the driver stack and transferred to the mini filter manager. Tenth, since the file enters the mini filter, but the file is the file in the security folder, redirect processing does not occur. Eleventh, the IRP toward "d:\\_sec\temp\1.txt" is transferred to a file system driver. In the file system driver, generation processing for "d:\\_sec\temp\1.txt" is performed.

When the program or processor accesses the file system in order to read the file in the secure storage area, the security program read control unit 250 determines whether the corresponding program coincides with access permission process for the secure storage area recorded in the security policy memory unit 220. When the corresponding program coincides with the access permission process according to the determination result, the security program read control unit 250 allows the corresponding process to read the file in the secure storage area. In this case, the security program read control unit 250 switches the access permission process regarding the secure storage area to a monitoring process to be recognized immediately after the corresponding process accesses the secure storage area [see S240 of FIG. 2].

Further, the security program read control unit 250 is configured to determine the access of the process or not only in the file system event generated in the secure storage area to permit the stored file to be read other than the secure storage area in the case of reading the stored file and disable the file other than the secure storage area according to the security policy.

An embodiment depending on read control of the secure storage area may be executed at various levels such as dialogue box hooking at a level of the filter drive, the mini filter drive, or the Win32, and the like. However, in the present specification, as one implementation example among the implementation examples, an embodiment that interrupts or permits the access while monitoring the file system event in the secure storage area by using the mini filter drive technology is described with reference to FIG. 7. Referring to the embodiment of FIG. 7, during attempting reading log.ext in the secure storage area by using a program called Editorplus, an event log in which reading by the security program read control unit 250 is interrupted and a user screen are illustrated.

The security program write control unit 260 is a component unit that permits storage when the file storage event occurs in the secure storage area by referring to the file system event at the time of attempting storing the file in the monitoring program or monitoring process that reads the file in the secure storage area and prevents storage at the time of attempting storage in other areas [see S260 and S270 of FIG. 2].

As an example, in the case of a method for preventing storage, the security program writing may be controlled at various levels such as a method for verifying which program attempts the corresponding storage event by referring the file system event and the process that causes the corresponding event is also present, a method for limiting a storage dialogue box of the program to only the secure storage area, and the like.

Figure 8:
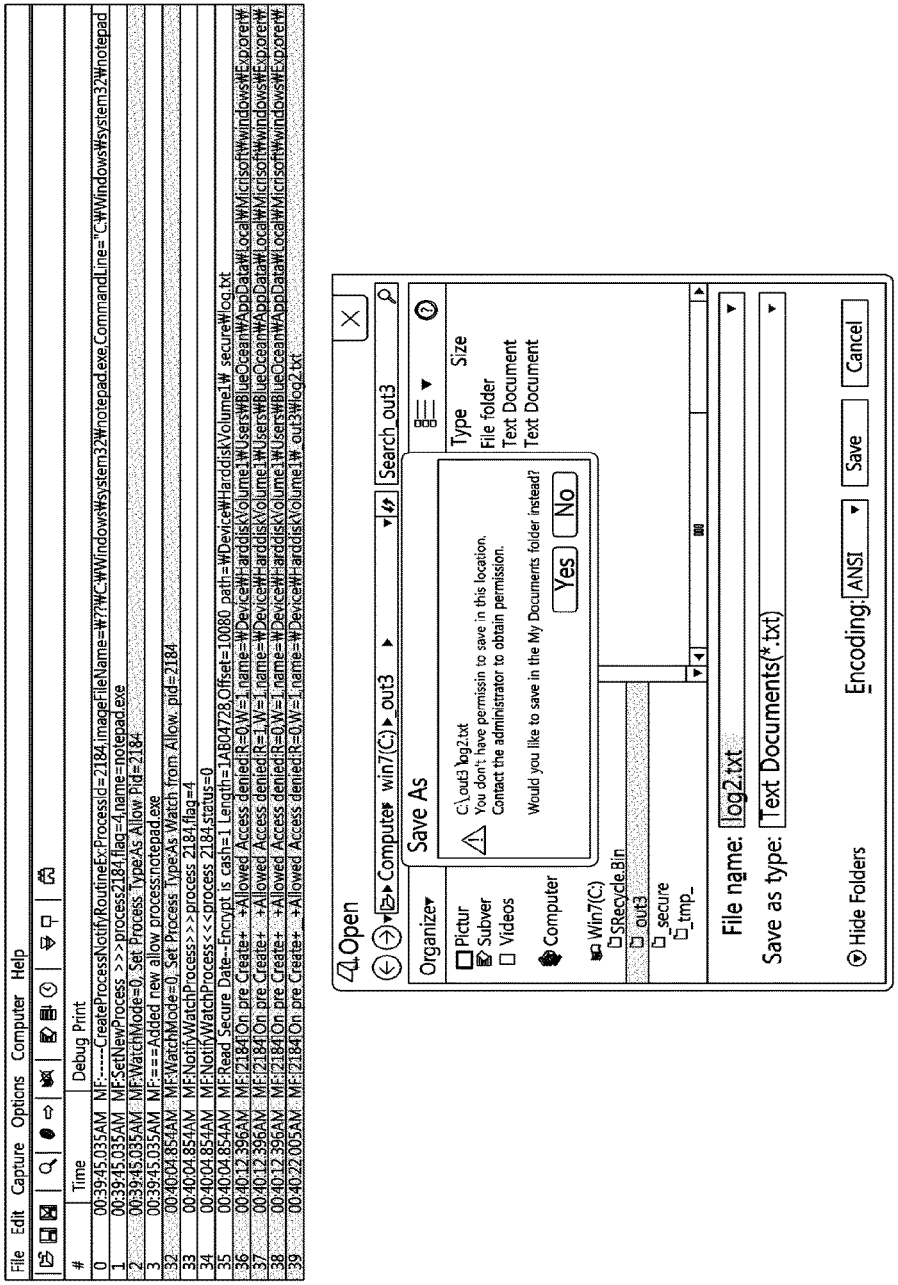
FIG. 8 illustrates an embodiment in which file storage is interrupted when a Notepad program opens a file in the secure area and attempts storage in the non-secure area.

As a detailed embodiment of the read/write control, an operation scheme of FIG. 8 using the mini filter drive is described. When notepad.exe of which the access is permitted is accessed while monitoring the file system event in the secure storage area, the corresponding process is a permission process, the access is permitted and the corresponding process is changed to the monitoring process to permit reading. Thereafter, when the file of which reading is permitted is attempted to be stored in a space other than the secure storage area, storing a process ID of notepade stops as illustrated in the event log from column #36 to #39 of FIG. 8.

In the scheme described in the embodiment, it is described that a single program is interrupted from storing one data file, but when one process reads multiple documents in a thread scheme like MS Word, in the case where even one thread reads the document in the secure storage area, the file system event may be controlled so as to store the file only in the secure storage area.

The secure storage area encryption/decryption unit 270 is a component unit that decrypts or encrypts a reading/writing event of the file system which occurs in the corresponding storage space when the file is stored in the secure storage area. When the file system event occurs, the corresponding data may be encrypted/decrypted by hooking the reading/writing event by suing the mini filter drive or the file system filter drive.

The secure storage area display control unit 280 may configure and display the secure storage area to a folder under a specific volume or configure and display the secure storage area as a drive volume. Further, the corresponding secure storage area may be controlled not to be displayed before user authentication to be displayed only after the user authentication.

When the security program event control unit 290 intends to select, copy, and attach a data area for each process or select the data area, drag-and-drop the selected data area with a mouse, and copy data, the data may be copied by the process that accesses the secure storage area in a process that reads general area data, but the security process controls data not to be copied by a general-area process [see S250 of FIG. 2].

Figure 9:
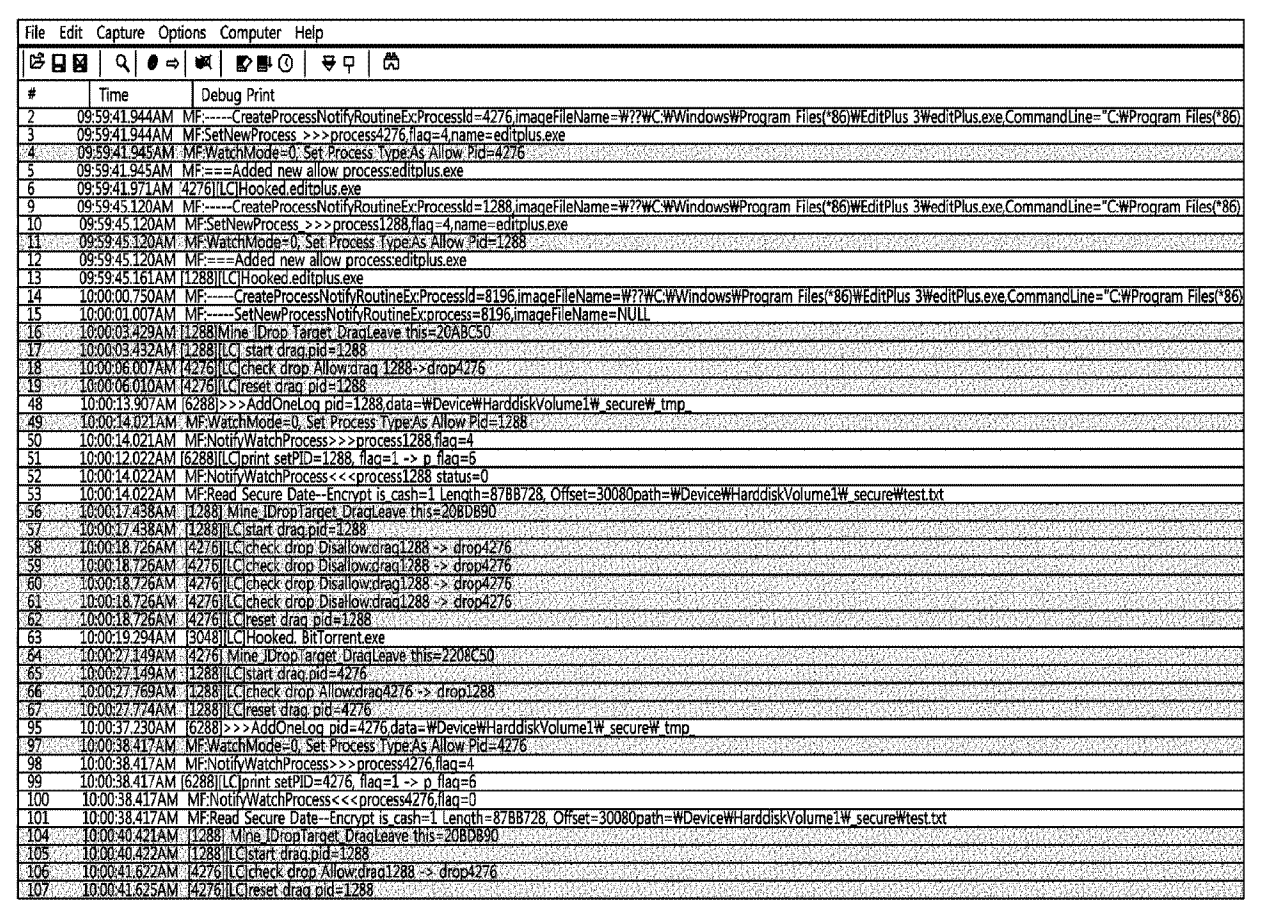

In the embodiment of FIG. 9, by hooking an entire area of a program in which a user window is present at the level of Win32, whenever the program is driven, the program is injected, and the corresponding program is copied/attached and a mouse event is monitored. When the program (Editorplus in the case of FIG. 9) of which the access to the secure storage area is permitted is driven by each of two processes (1288 and 4276), both processes are permission processes of which the access to the secure storage area process is permitted as shown in an 18-th column, but when both processes have not yet been processes to be monitored, drag-and-drop of a data text from process #1288 to process #4276 by the mouse is successively performed. On the contrary, when process #1288 becomes the monitoring process as shown in a 49-th column, drag-and-drop from process #1288 to process #4276 is interrupted as shown in a 58-th column. Further, as shown in a 66-th column, drag-and-drop from process #4276 to process #1288 is permitted.

Further, the secure storage area control unit 200 may additionally include a file export control unit 2AA, a duration control unit 2BB, a printer spool control unit 2CC, a system cache initialization unit 2DD, and a program drive learning unit 2EE in addition to 9 lower component units (see reference numerals 210 to 290 of FIG. 1) which are described above.

The file export control unit 2AA is a component unit that allows the file in the secure storage area to be decrypted and copied to another place other than the secure storage area. According to the embodiment, a user having an export authority transmits the document to an accessible server through the security policy memory unit 220 to perform export and copy a file to exported in the secure storage area to a predetermined area (a wallpaper or My document and a mounted USB drive of the corresponding PC) and transmitted to a server designated to record an export history before export according to a policy authority. That is, the file export control unit 2AA decides (controls) whether the file kept in the secure storage area may be copied (exported) to the non-secure area according to an authentication procedure or a user security policy through the network.

The duration control unit 2BB is a component unit that forcibly deletes the file in the secure storage area or hides the file so that the user does not access the file when a file time (a generation time, a modification time, an access time, or the like) or a metadata management time is more than a time set in the policy in order to prevent the file in the secure storage area from being kept for a long time when the file in the secure storage area is generated. This is effective for the user to induce the corresponding file to be transported to a designated specific server before duration of the corresponding file arrives without keeping the file as long as possible. To this end, the duration control unit 2BB may include a function to notify a list of files of which duration is going to arrive to the user.

The printer spool control unit 2CC is a component unit that controls the user to output or not to output the document through the corresponding program according to a security policy (that is, a policy regarding whether the corresponding user accesses the printer spool for each program) regarding the printer spool recorded in the security policy memory unit 220. That is, the printer spool control unit 2CC decides (controls) whether the program accessing the secure storage area may transmit the document to the printer spool.

The system cache initialization unit 2DD is a component unit that initializes various data cache spaces provided by the operating system OS. As an example, in the related art, when decrypted file data remain on a file system buffer and the access control to the secure storage area is completed and thereafter, a program to read the corresponding file data is driven to call a recently read file, the decrypted data may be read in the corresponding program by using the file system buffer provided by the file system without accessing a file system in which the recently read file is encrypted and present according to a file system buffer function of the operating system. As another example, when a text string of the file kept in the secure storage area is loaded on the memory like a clipboard in addition to the file system, after the access control to the secure storage area is completed, leakage of the data of the corresponding clipboard may be attempted by redriving the same program. As yet another example, when the program stores a specific data value (e.g., a recently used file name) in a registry, leakage of a string corresponding to security in the secure storage are may be attempted like the clipboard.

In order to prevent such a problem, in the embodiment of the present invention, the system cache initialization unit 2DD may initialize registry values used by a file system cache, the clipboard, and the monitoring process, and the like according to a type of the operating system when the secure storage area control unit 200 stops by a request of the user. In some cases, when the operating system does not support initialization of the file system or the clipboard cache, the system cache initialization unit 2DD may forcibly log out a user session or forcibly reboot the computer.

Since the program drive learning unit 2EE may not verify a program installed in a user PC and a version of the program, when the secure storage area control unit 200 may not apply the security policy, in the case where a latent security program of which the access to the secure storage area is to be permitted is driven in the corresponding PC, it is learned which version of program the program is. The program drive learning unit 2EE may deduce attribute information of the program or a registered registry value or a hash value of a binary file of a drive file of the program and transmit the deduced hash value to the server or verify version information of the corresponding program through the data file received from the server. In this case, the program drive learning unit 2EE may register the verified version information of the program in the security policy memory unit 220 or transmitted to the server through the network.

Further, the program drive learning unit 2EE may determine folders and files required for driving the corresponding program by referring to the file system event which occurs when driving the program in addition to the version information of the program. Therefore, the program drive learning unit 2EE may deduce a file or folder path value which needs to be copied to the secure storage area in advance when driving the corresponding program, a file or folder path value which should be recovered when the secure storage area control unit 200 is completed, and the like and send the corresponding information to the security policy memory unit 220 or transmit the corresponding information to the server through the network.

In particular, the program drive learning unit 2EE may reverify a drive path of the program when the program is installed in another predetermined path other than a basic installation path or when the user arbitrarily changes a drive environment of the program in the case where a specific business program is initially installed in the user PC.

The present invention that controls the program that accesses the secure storage area further includes a PC drive control unit 300 in addition to the secure storage area control unit 200 to reinforce the access control of the program to the secure storage area.

The PC drive control unit 300 may include a PC drive policy control unit 310, a drive policy memory unit 320, a program drive control unit 330, a network drive control unit 340, and a USB drive control unit 350.

The PC drive control unit 300 may include a PC drive policy control unit 310, a drive policy memory unit 320, a program drive control unit 330, a network drive control unit 340, and a USB drive control unit 350. The drive policy memory unit 320 may store information regarding a PC drive policy, which includes a program list which may be driven in a PC for each user and a network domain which needs to be accessed or interrupted in the PC, an IP, a port list, a read/write impossible value, a read only value, a readable/writable value, and the like of the USB used in the PC. The PC drive policy may be kept in the encrypted file format or received from a designated specific server after the user authentication.

The program drive control unit 330 is a component unit that controls the program driven in the PC to be driven within a program range set for each user in the drive policy memory unit 320. As a result, the program drive control unit 330 interrupts driving of a program not recorded in the drive policy memory unit 320. Further, the program drive control unit 330 may perform even a function to prevent a malicious user from driving a program that attaches or incapacitates the secure storage area control unit 200 in the corresponding PC.

The network drive control unit 340 is a component unit that permits the network to be accessed only within a range set for each user in the drive policy memory unit 320 by limiting a network server and a service which is accessible. As a result, the network drive control unit 340 interrupts access of the network to a network not recorded in the drive policy memory unit 320. Therefore, an access to intrude the secure storage area by an external hacker may be originally interrupted and even an internal user may transmit the file in the secure storage area to only a network server and a server which are authorized.

The USB drive control unit 340 is a component unit that enables the USB read/write operation only within a range set for each user in the drive policy memory unit 320 by limiting the read/write operation of the USB drive. As a result, the USB drive control unit 340 may selectively interrupt the read/write operation of the USB based on the policy recorded in the drive policy memory unit 320. Therefore, when the internal user intends to copy the file in the secure storage area to an external USB by using the file export control unit 2AA, the USB drive control unit 340 may control the corresponding file to be permitted to be copied to the USB or not permitted to be copied to the USB contrary to this according to the range set for each user.

The present invention has been described with reference to the embodiments of the present invention. However, it will be appreciated by those skilled in the art that various modifications and changes of the present invention can be made without departing from the spirit and the scope of the present invention which are defined in the appended claims and their equivalents.

What is claimed is:

1. A computer implemented method for executing access control of an application program for a secure storage area, the method comprising:

executing, by a user terminal, an application for business security according to user authentication;

copying a file required for driving for each application program which being permitted to access the secure storage area for the business security or a folder of an original path to a predetermined path in the secure storage area;

switching a drive path of the corresponding application program from the original path to a path depending on the copied folder in the secure storage area for each application program which is permitted to access the secure storage area;

in response to detection of the application program being executed, extracting at least one of a security policy regarding an access permission program which being permitted to access the security storage area or process information, file or folder information to be copied before driving the access permission program, and drive path switching information of the access permission program which correspond to the user authentication;

in response to detection of the application program access to the secure storage area, determining whether the application program corresponds to the access permission program or access process, the determination being performed according to the security policy; and in response to determination of the application program corresponds to the access permission program or access process, permitting access by the access application program or access process to the secure storage area and recognizing the access permitted application program or access process for a monitoring process.

2. The method of claim 1, wherein the security policy includes file or folder information to an original drive path from the folder of the switched drive path, and in response to completion of execution of the application, extracting the file or folder for each application program which being permitted to access the secure storage area from the security policy and recopying or updating the extracted file or folder to the original path in response to completion of the execution of the application.

3. The method of claim 1, further comprising:

in response to detection of a text copy event of the file in the secure storage area by the monitoring process or a text attach event to other process, permitting execution depending on the corresponding event, the permission being performed only when the other process is determined as the monitoring process.

4. The method of claim 1, further comprising:

in response to detection of storing the file in a storage area other than the secure storage area, interrupting execution of storing of the corresponding file.

5. The method of claim 2, further comprising:

initializing at least one of a file system, a cache clipboard, and a registry value supported by an operating system in response to the execution of the security event being completed.

6. The method of claim 2, further comprising:

verifying version information on a non-verified application program, file or folder information required to drive the corresponding program file or folder information, and information on an original installation path of the corresponding program; and adding the non-verified application program to a security target program by reflecting the verification result to the security policy.

\* \* \* \* \*